United States Patent Office 2,792,384
Patented May 14, 1957

---

2,792,384
ANTHRAQUINONE VAT DYESTUFFS

Theodor Holbro, Basel, and Walter Kern, Sissach, Switzerland, assignors to Ciba Limited, Basel, Switzerland, a Swiss firm No Drawing. Application January 25, 1955, Serial No. 484,056

Claims priority, application Switzerland January 28, 1954

6 Claims. (Cl. 260—157)

The present invention provides new anthraquinone vat dyestuffs, which, as is shown for example in the case of the dyestuff of the formula (1)
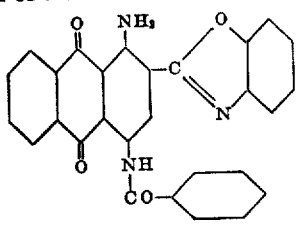

contain at least one anthraquinone nucleus substituted in 1-position by an amino group and in 4-position by an acylamino group and which in 2-position is attached directly to a carbon atom of a 5- or 6-membered hetero ring, which ring contains as further ring members two hetero atoms attached to the mentioned carbon atom, including a nitrogen atom having its valencies entirely occupied in ring formation, together with two to three further carbon atoms which are at the same time ring members of a further non-vattable ring system which can itself be attached to any other ring systems.

The hetero rings present in these new dyestuffs, as above stated contain a nitrogen atom having its valencies entirely occupied in ring formation.

The new dyestuffs of this constitution can, for example, comprise a single anthaquinone nucleus and a hetero ring of the above described type attached thereto. This is the case, for example, with the dyestuffs of the formula (2)
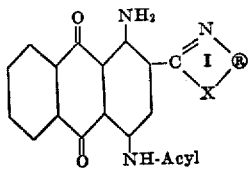

in which —X— stands for

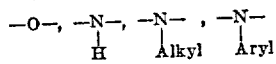

or —S— and R indicates a cyclic radical such that the hetero ring I contains two to three carbon atoms which also belong to a non-vattable ring system of the radical R.

As is clear from the above description, the hetero ring I of the Formula 2 can be an oxazole, imidazole, N-alkyl-imidazole, N-arylimidazole or thiazole ring, so long as two adjacent carbon atoms of the attached ring system R are also members of the ring I. Besides these 5-membered hetero rings, the dyestuffs can also contain 6-membered hetero rings. In this case the hetero ring contains three adjacent carbon atoms and these at the same time form a part of the ring system R, the hetero ring being of necessity attached in a so-called peri-position to the ring system R.

Apart from the fact that the ring system R must not be vattable, it can be of any constitution, for example aromatic or heterocyclic. There can be concerned, for example, a benzene ring condensed by two ring carbon atoms in 0-position to the hetero ring I, or a naphthalene ring condensed in 1:2- or 2:3-position with the hetero ring I. The ring systems R can contain the customary substituents present in vat dyestuffs, for example halogen atoms such as fluorine, chlorine or bromine, low molecular alkyl or alkoxy groups, such as methyl, ethyl, methoxy or ethoxy groups, alkyl or phenyl sulfone groups or sulfonic acid dialkylamide groups. Moreover the ring systems can also be attached either directly or by way of a bridge member, as for example an —SO₂— or —CO—NH—bridge, with further ring systems.

The new anthraquinone vat dyestuffs contain more than one, for example two, anthraquinone nuclei substituted in the manner set forth above. Valuable dyestuffs of this kind are, for example, those which contain, linked together, two acylamino groups, each in a 4-position of the anthraquinone nuclei which are furthermore substituted in the above described manner. These dyestuffs correspond to the formula (3)
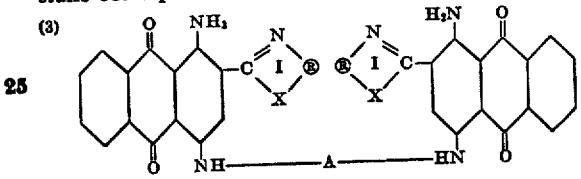

in which —X— stands for

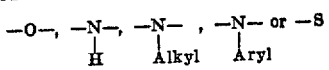

and R indicates a cyclic radical, the hetero rings I each containing two to three carbon atoms, which also belong to a non-vattable ring system of the radicals R, and A is the acyl radical of a dicarboxylic acid, a triazine or quinazoline radical.

As regards the ring system R and the hetero ring I, the same remarks apply here as were made in connection with Formula 2 above.

The radical A can be the radical of any dicarboxylic acid, attached by the —CO— groups of their two carboxylic acid groups to the —NH— groups, for example of an aliphatic dicarboxylic acid such as oalic acid, or more especially of a cyclic, for example an aromatic or heterocyclic dicarboxylic acid. As examples the following dicarboxylic acids may be mentioned: isophthalic acid terephthalic acid, 1:1' - diphenyl - 4:4' - dicarboxylic acid, naphthalene-2:6-dicarboxylic acid, 1:1'-azobenzene-3:3'-dicarboxylic acid, 1:1'azobenzene-4:4'-dicarboxylic acid, azodiphenyl-4:4'-dicarboxylic acid of the formula

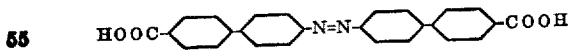

fluoranthene - 4:11 - dicarboxylic acid, anthraquinone-2:6-dicarboxylic acid, 1:5-dinitroanthraquinone-2:6-dicarboxylic acid, 1:5-diaminoanthraquinone-2:6-dicarboxylic acid, benzanthrone-6, Bz.1-dicarboxylic acid, benzanthrone-2:6-dicarboxylic acid, thianthrene-dicarboxylic acid.

As already stated, the radical A can also be a triazine or quinazoline radical, for example, a radical of the constitution (4)
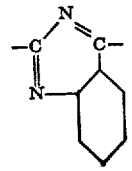

or (5)

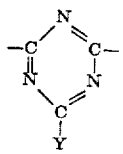

in which Y indicates any radical, for example a halogen atom, a hydroxyl group, an —NH₂— group, an alkyl, an aryl or an —NH— aryl radical.

The dyestuffs of Formula 3 can also be of asymmetric constitution. Thus, for example, they can contain two different hetero rings and/or two different radicals R.

The anthraquinone nuclei can also contain further substituents, in addition to those in 1-, 2- and 4-position, preferably in the 6-membered ring not containing these substituents, for example halogen atoms, alkyl sulphone groups or further acylamino groups present in 6- and/or 7-position.

Furthermore, the new dyestuffs can also contain the above specified substituents twice in the same anthraquinone nucleus, for example in the 1- and the 5-position an —NH₂ group, in the 4- and the 8-position an acylamino group and in the 2- and the 6-position a hetero ring of the specified type.

The new dyestuffs of the constitution set forth above are obtained when in anthraquinones which contain in 1-position an —NH₂ group or a substituent convertible thereinto, in 4-position no substituent, an acylamino group or a substituent convertible thereinto and in 2-position a substituent containing a CO group and capable of reaction with amino groups, preferably a carboxylic acid halide group, in suitable sequence, if desired (i. e., unless an NH₂ group is already present) the substituent present in 1-position is converted into an NH₂ group and, if the acylamino group is not already present, the substituent present in 4-position converted thereinto, or such a substituent first introduced into the 4-position and then converted into an acylamino group, the substituent present in 2-position condensed with an amine of which the amino group is attached to a non-vattable ring system and which contains in the adjacent or peri-position to the amino group a substituent which together with this amino group, the carbon atoms between it and the amino group and the substituent present in 2-position of the anthraquinone nucleus is capable of the formation of a 5- or 6-membered hetero ring and hetero ring closure effected at this atom grouping.

Dependent upon the constitution of the starting materials and end products certain specific modifications of the process of manufacture may prove to be especially suitable.

In general the dyestuffs are advantageously produced by acylating the amino group present in the 4-position of the anthraquinone nucleus of a 1:4-diaminoanthraquinone which in 2-position is attached directly to a carbon atom of a 5- or 6-membered hetero ring which contains as further ring members two hetero atoms attached to the said carbon atoms, including a nitrogen atom all the valencies of which are occupied in ring formation, and also two to three carbon atoms which are at the same time ring members of a further non-vattable ring system which latter can be attached to any other ring systems.

The 1:4-diaminoanthraquinone susbtituted in 2-position in the specified manner, is prepared by the method described above, for example by condensing a 1-amino-4-nitro-anthraquinone-2-carboxylic acid halide, preferably the chloride of this acid, with a primary amine of which the amino group is attached to a non-vattable ring system and which contains in the adjacent position or peri-position to the amino group for example a hydroxyl group, a further primary or a secondary amino group, a halogen atom, a nitro group or a mercepto group, effecting ring closure in the resulting 1-amino-4-nitroanthraquinone-2-carboxylic acid amide and then reducing the nitro group to the NH₂ group.

In the synthesis of the intermediate compounds further reactions can be carried out on the ring system condensed with the hetero ring.

Other modifications of the general methods of production set forth above may often be of value. Thus for example, the acylamino group present in 4-position of the anthraquinone nucleus of the final materials, can have been introduced also by reaction of a halogen atom previously present in this position, for example a chlorine or bromine atom, with a carboxylic acid amide or an aryl-sulfonic acid amide, in the latter case the —NH—O₂S-aryl group introduced into the 4-position of the anthraquinone nucleus being advantageously hydrolysed to the NH₂ group and this then further acylated by means of a carboxylic acid halide.

When anthraquinone compounds are used as starting materials which at the commencement contain no substituents in 4-position, as for example 1-aminoanthraquinone-2-carboxylic acid halides, first the condensation on the carboxylic acid halide group followed by ring closure may take place and then in the conventional manner the intermediate products obtained nitrated or halogenated in 4-position of the anthraquinone nuclei, the nitro groups or halogen atoms converted into amino groups and the products acylated in the manner described.

In the synthesis of the new dyestuffs, instead of condensing an anthraquinone substituted in 2-position by a carboxylic acid halide group, with an amine of the specified type and then effecting ring closure, it is also possible in some cases to react an anthraquinone substituted in 2-position by an aldehyde group, for example a 1-amino-4-halogenanthraquinone-2-aldehyde, with a p-diamino-benzoquinone, such as 2:5-diamino-3:6-dichlorobenzoquinone-(1:4), with the direct formation of the oxazole compound. In this case a simultaneous conversion takes place of the quinone ring into a benzene ring, and the resulting product can, if desired, be condensed in this benzene radical, which still contains a primary amino group and a hydroxyl group in o-position thereto, with a carboxylic acid chloride, for example an anthraquinone-2-carboxylic acid halide, which contains in 1- and 4-position the substituents required in starting materials for the present process, whereupon at this position in the molecule, an oxazole ring closure can be effected. This modification of the process is also suitable for the manufacture of both symmetrical and more especially asymmetrical dyestuffs. Thus, for example, the starting materials can be so selected that either the radical derived from the anthraquinone-2-aldehyde or the radical derived from the anthraquinone-2-carboxylic acid halide contains in 1- and 4-position the substituents necessary for the production of the dyestuffs according to the present invention or allows of the possibility of the introduction of these substituents. The radical which does not fulfil this condition can be of any constitution, that is to say there can be used for its introduction into the dyestuff molecule any aldehyde or any carboxylic acid halide. In general, however, anthraquinone compounds are also valuable in this case, as for example anthraquinone-2-carboxylic acid halides, especially 1-aminoanthraquinone-2-carboxylic acid halides.

The reactions required in the process of this invention can be carried out in any conventional manner.

The vat dyestuffs obtained possess the constitution hereinbefore set forth and can be used in the known manner as such or in the form of the leuco ester salts obtainable by conventional methods, for the dyeing and printing of a variety of fibres of animal but more especially of vegetable origin, i. e. for wool or silk but preferably for cotton, linen, artificial silk and staple fibre from regenerated cellulose and also for polyamide fibres.

The dyeings and printings are distinguished by great strength and very good fastness properties. There are obtained among others grey and blue shades or shades of which the color is displaced towards blue, and which together with the customary fastness to wet processes and together with good fastness to light possess a good fastness to drops of water and good color in artificial light.

The following examples illustrate the invention, the parts being by weight unless otherwise stated and the relationship between part by weight and part by volume being the same as that of the kilogram to the liter:

Example 1

To a suspension of 35.5 parts of 2-[1':4'-diaminoanthraquinonyl-(2')]-benzoxazole in 600 parts of dry nitrobenzene are added 17 parts of benzoyl chloride and 10 parts of dry pyridine. After stirring for 4 hours at 65° C., the dyestuff formed is filtered off and washed with nitrobenzene and with alcohol. There is obtained in this manner in excellent yield a dark powder which dissolves in concentrated sulfuric acid with an olive color, which after the addition of formaldehyde changes towards green blue. After conversion into a form suitable for dyeing, advantageously into a paste, the dyestuff dyes cotton from a claret colored vat in blue violet shades. It possesses the following constitution (6)
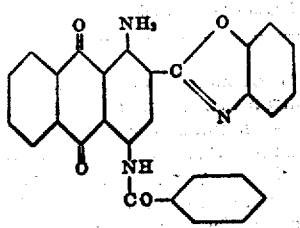

The same dyestuff is obtained by condensation of 1-amino-4-benzoylaminoanthraquinone-2-carboxylic acid chloride with 2-aminophenol with subsequent ring closure, for example by heating in trichlorobenzene with the addition of p-toluene sulfonic acid.

The 2-[1':4'-diaminoanthraquinonyl-(2')]-benzoxazole can be prepared as follows:

330 parts of 1-amino-4-nitroanthraquinone-2-carboxylic acid chloride and 114 parts of 1-amino-2-hydroxybenzene are suspended in 5200 parts of dry o-dichlorobenzene and after the addition of 100 parts of dry pyridine stirred for 5 hours at 65° C. The resulting mixture is filtered, the filter cake washed with o-dichlorobenzene and the adhering solvent removed by steam distillation. The resulting orange brown condensation product melts at 275° C. with decomposition and dissolves in concentrated sulfuric acid with a yellow color which on addition of formaldehyde changes toward blue. It possesses the following constitution:

(7)
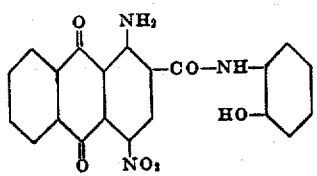

201.5 parts of this intermediate product are heated to boiling for one hour with stirring with 10 parts of crystalline p-toluene sulfonic acid and 3000 parts of trichlorobenzene, as a result of which water and some solvent distil off. The condensation product, which is dark brown, is, after cooling, filtered with suction and washed with trichlorozenzene, benzene and alcohol and then melts at 315° C. and dissolves in concentrated sulfuric acid with a yellow brown color which on addition of formaldehyde changes towards blue. It constitutes an oxazole of the following constitution:

(8)
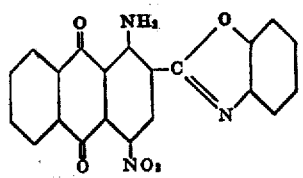

150 parts of the resulting 2-[1'-amino-4'-nitroanthraquinonyl-(2')]-benzoxazole are suspended with stirring in 1500 parts of pyridine and treated at boiling temperature in the course of 15 minutes with 47 parts of hydrazine hydrate. After boiling for one hour, the whole is allowed to cool and the resulting 2-[1':4'-diamino-anthraquinonyl-(2')]-benzoxazole filtered off; it melts at 300° C. and dissolves in concentrated sulfuric acid with a brown color which on addition of formaldehyde changes towards green.

Example 2

To a solution of 20.3 parts of isophthalic acid dichloride in 1900 parts of dry nitrobenzene are added with stirring 71 parts of 2-[1':4'-diaminoanthraquinonyl-(2')]-benzoxazole and 20 parts of dry pyridine. The suspension is stirred for 3 hours at 95° C. and then for 5 hours at 135° C., filtered after cooling and the residue, after washing with nitrobenzene and alcohol, dried. The dyestuff obtained in very good yield of the formula (9)
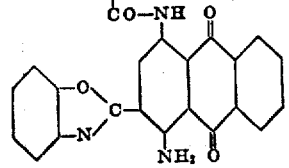

dissolves in concentrated sulfuric acid with an olive brown color which on addition of formaldehyde changes to greenish blue; it dyes cotton from a claret vat in subdued blue violet shades.

Further valuable dyestuffs are set forth in Table A below. These are obtained when 2-[1':4'-diaminoanthraquinonyl-(2')]-benzoxazole is condensed according to the above example in the molecular proportion 2:1 with the dicarboxylic acid dichlorides of column I.

In a similar manner valuable dyestuff are obtained when compounds of the formula

(10)
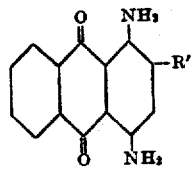

are condensed with isophthalic acir dichloride in the molecular proportion 2:1. In formula 10 R' has the composition set forth in column I of Table B. The individual compounds of the Formula 10 can be prepared by the directions of Example 1 from 1-amino-4-nitroanthraquinone-2-carboxylic acid chloride and the aminohydroxycompounds shown in brackets in column I of Table B.

A

| | I Acylating agent | II Color of solution in H₂SO₄ | III Vat | IV Dyeing (cotton) |
|---|---|---|---|---|
| 1 | terephthalic acid dichloride. | brownish red | ruby | navy. |
| 2 | 1:1'-diphenyl-4:4'-dicarboxylic acid dichloride. | brown | claret | grey. |
| 3 | naphthalene-2:6-dicarboxylic acid dichloride. | olive | do | Do. |
| 4 | 1:1'-azobenzene-3:3'-dicarboxylic acid dichloride. | brown | do | reddish navy blue. |
| 5 | 1:1'-azobenzene-4:4'-dicarboxylic acid dichloride. | orange brown | do | grey. |
| 6 | thianthrene dicarboxylic acid dichloride. | brown | do | reddish grey. |
| 7 | 1:5 - diaminoanthraquinone - 2:6 - dicarboxylic acid dichloride. | yellow brown | violet | red violet. |

B

| | I —R' (aminohydroxy compound) | II Color of solution in H₂SO₄ | III Vat | IV Dyeing (cotton) |
|---|---|---|---|---|
| 1 | (1-amino-2-hydroxy-5-methylbenzene) | green | red brown | grey violet. |
| 2 | (1-amino-2-hydroxy-5-methoxybenzene) | olive green | do | violet grey. |
| 3 | (1-Amino-2-hydroxy-5-chlorobenzene) | green | do | violet. |
| 4 | (3-Amino-4-hydroxydiphenylsulfone) | do | black brown | Do. |
| 5 | (1-Amino-2-hydroxy-benzene-sulfonic acid diethylamide) | olive green | violet | Do. |
| 6 | (1-Amino-2-mercapto-benzene) | red | do | navy blue. |
| 7 | (1:2-diamino-benzene) | olive green | red brown | blue grey. |
| 8 | (1-Amino-2-hydroxy-naphthalene) | orange brown | claret | grey. |
| 9 | (2-Amino-3-hydroxy-naphthalene) | brown orange | violet | blue grey. |
| 10 | (1-Amino-8-hydroxy-naphthalene) | brown red | black violet | reddish blue. |

*Example 3*

To a solution of 2.03 parts of isophthalyl chloride in 200 parts of nitrobenzene are added at 20° C., 3.55 parts of 2 - [1':4' - diaminoanthraquinonyl - (2')] - benzoxazole and also 3 parts of pyridine and the whole stirred for 2 hours at 45–50° C. and 1 hour at 60–65° C. Thereupon 3.4 parts of 4 - aminoanthraquinone - 1(N):2-benzacridone are added and the reaction mixture stirred for 6 hours at 150–160° C. The dyestuff, which is filtered off after cooling, dissolves in concentrated sulfuric acid with a brownish orange color and dyes cotton from a claret vat in blue shades. It probably corresponds to the following formula (11)

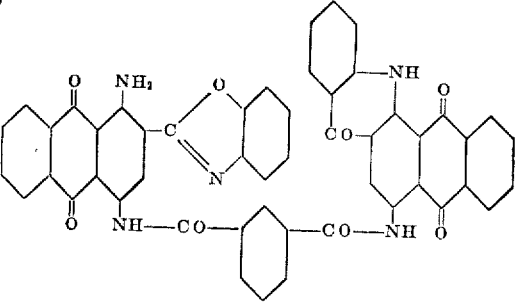

*Example 4*

35.5 parts of 2-[1':4'-diaminoanthraquinonyl-(2')]-benzoxazole are stirred for 3 hours at 175–185° C. with 9.2 parts of cyanuric chloride in 850 parts of dry nitrobenzene. After cooling to 60° C., filtration and washing, the dyestuff obtained in good yield dissolves in concentrated sulfuric acid with a yellow brown color and dyes cotton from a claret vat in grey blue shades. It possesses the following constitution:

(12)

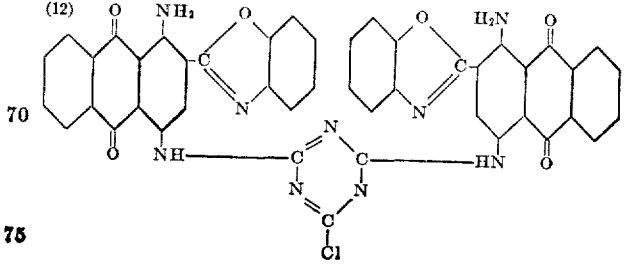

By replacement of the chlorine atom by the amino group (for example by reaction with ammonia in boiling nitro-benzene) a dyestuff is obtained which dyes cotton in somewhat more greenish shades than the above described dyestuff.

*Example 5*

Into 100 parts of phenol at 150° C. are introduced 3.55 parts of 2-[1':4'-diaminoanthraquinonyl-(2')]-benzoxazole and 0.82 part of 2-methyl-4:6-dichloro-1:3:5-triazine. The melt is then stirred for 5 hours at 145–155° C. The mixture cooled to 120° C. is treated with 100 parts of pyridine and the precipitated product filtered off at 60° C. and washed with pyridine and alcohol. There is obtained in this manner a dyestuff which dissolves in concentrated sulfuric acid with a yellow brown color and dyes cotton from a claret vat in reddish blue shades.

*Example 6*

10 parts of a 10% paste of the dyestuff of Formula 6 obtainable according to Example 1, are vatted at about 50° C. in 150 parts of water with the addition of 3 parts of sodium hydrosulfite and 6 parts by volume of 30% sodium hydroxide solution. To a dyebath of 2000 parts of water containing 4 parts by volume of 30% sodium hydroxide solution and 2 parts of sodium hydrosulfite, the resulting stock vat is added. 100 parts of cotton yarn are entered at 40° C. into the dyebath, after 15 minutes 20 parts of sodium chloride are added and dyeing is conducted for one hour at 40–50° C. Thereupon the cotton is squeezed out, oxidized, rinsed in cold water, acidified, rinsed again and finally soaped at the boil for ½ hour. It is dyed in fast blue violet shades.

*Example 7*

30 parts of the dyestuff of Formula 6 described in Example 1, 240 parts of water, 600 parts of potassium carbonate thickening, 30 parts of 30% sodium hydroxide solution and 20 parts of sodium formaldehyde sulfoxylate are mixed together, heated to 50° C. and then ground. After the addition of a further 80 parts of sodium formaldehyde sulfoxylate a paste is obtained which is ready for printing. Cotton or other vegetable fibres can be printed with this paste in the normal manner. After printing, the print is dried, steamed for 8 minutes, rinsed, oxidized with a solution containing per liter of water 3 grams of sodium perborate and 2 grams of 40 percent acetic acid for 5 minutes, rinsed, soaped at the boil, rinsed again and dried. In this manner very fast blue violet printings are obtained.

What is claimed is:

1. An anthraquinone vat dyestuff of the formula

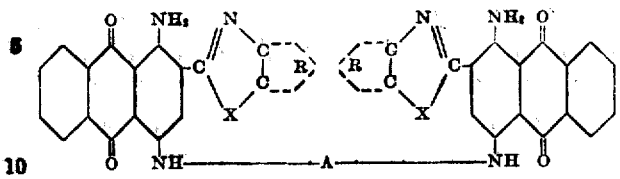

in which X is a member selected from the group consisting of

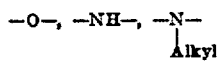

and

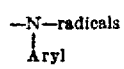

R indicates a member selected from the group consisting of benzene, halogen benzene, low molecular alkyl benzene, low molecular alkoxy benzene, alkyl sulfonyl benzene, aryl sulfonyl benzene, dialkysulfonamido benzene and naphthalene radicals, and A is the acyl radical of a member selected from the group consisting of aromatic dicarboxylic acid and 1,3,5-triazine radicals.

2. The anthraquinone vat dyestuff of the formula

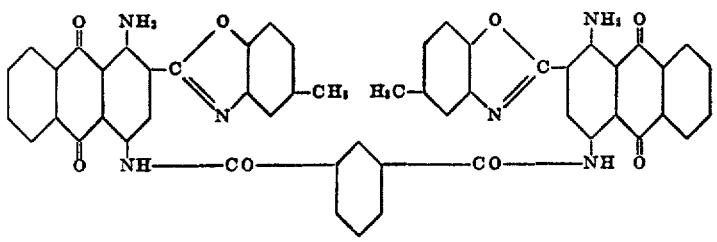

3. The anthraquinone vat dyestuff of the formula

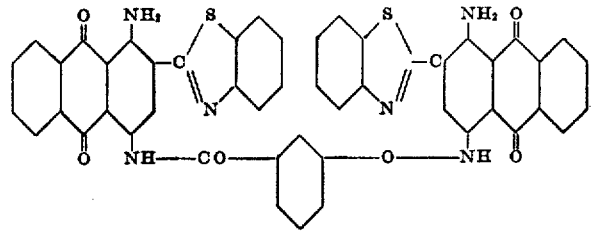

4. The anthraquinone vat dyestuff of the formula

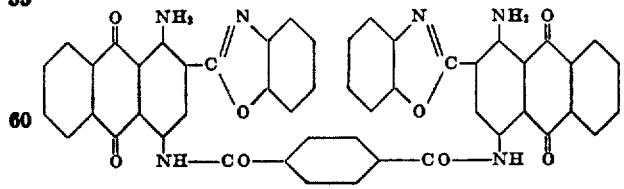

5. The anthraquinone vat dyestuff of the formula

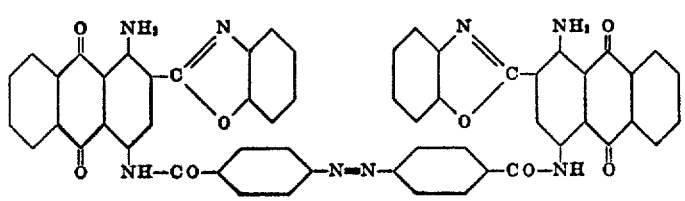

6. The anthraquinone vat dyestuff of the formula
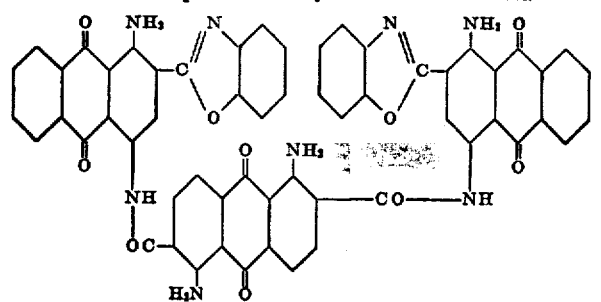
References Cited in the file of this patent
UNITED STATES PATENTS
| | | |
|---|---|---|
| 2,147,569 | Berthold et al. | Feb. 14, 1939 |
| 2,629,718 | Belshaw et al. | Feb. 24, 1953 |

UNITED STATES PATENT OFFICE
Certificate of Correction

Patent No. 2,792,384                                              May 14, 1957

Theodor Holbro et al.

It is hereby certified that error appears in the printed specification of the above numbered patent requiring correction and that the said Letters Patent should read as corrected below.

Column 2, line 3, for "0-position" read —o-position—; lines 31 to 33, for

line 46, for "oalic" read —oxalic—; line 49, after "acid", first occurrence, insert a comma; column 3, line 75, for "mercepto" read —mercapto—; column 6, lines 47 to 51, for that portion of the formula reading

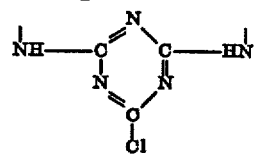

line 61, for "dyestuff" read —dyestuffs—; line 72, for "acir" read —acid—; column 8, lines 70 to 75, the lower portion of the formula should appear as shown below instead of as in the patent—

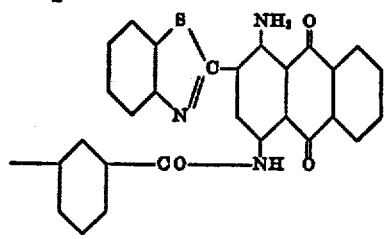

column 10, claim 3, right-hand portion of the formula should appear as shown below instead of as in the patent—

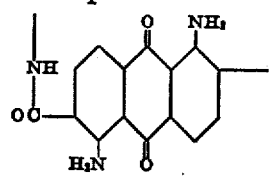

column 11, claim 6, lower left-hand portion of the formula should appear as shown below instead of as in the patent—

Signed and sealed this 1st day of October 1957.

[SEAL]

Attest:
KARL H. AXLINE,
*Attesting Officer.*

ROBERT C. WATSON,
*Commissioner of Patents.*